Jan. 2, 1968  V. BOBROWSKI  3,361,320
TAPERED-TUBE-MAKING DEVICE
Filed Aug. 20, 1964  4 Sheets-Sheet 1
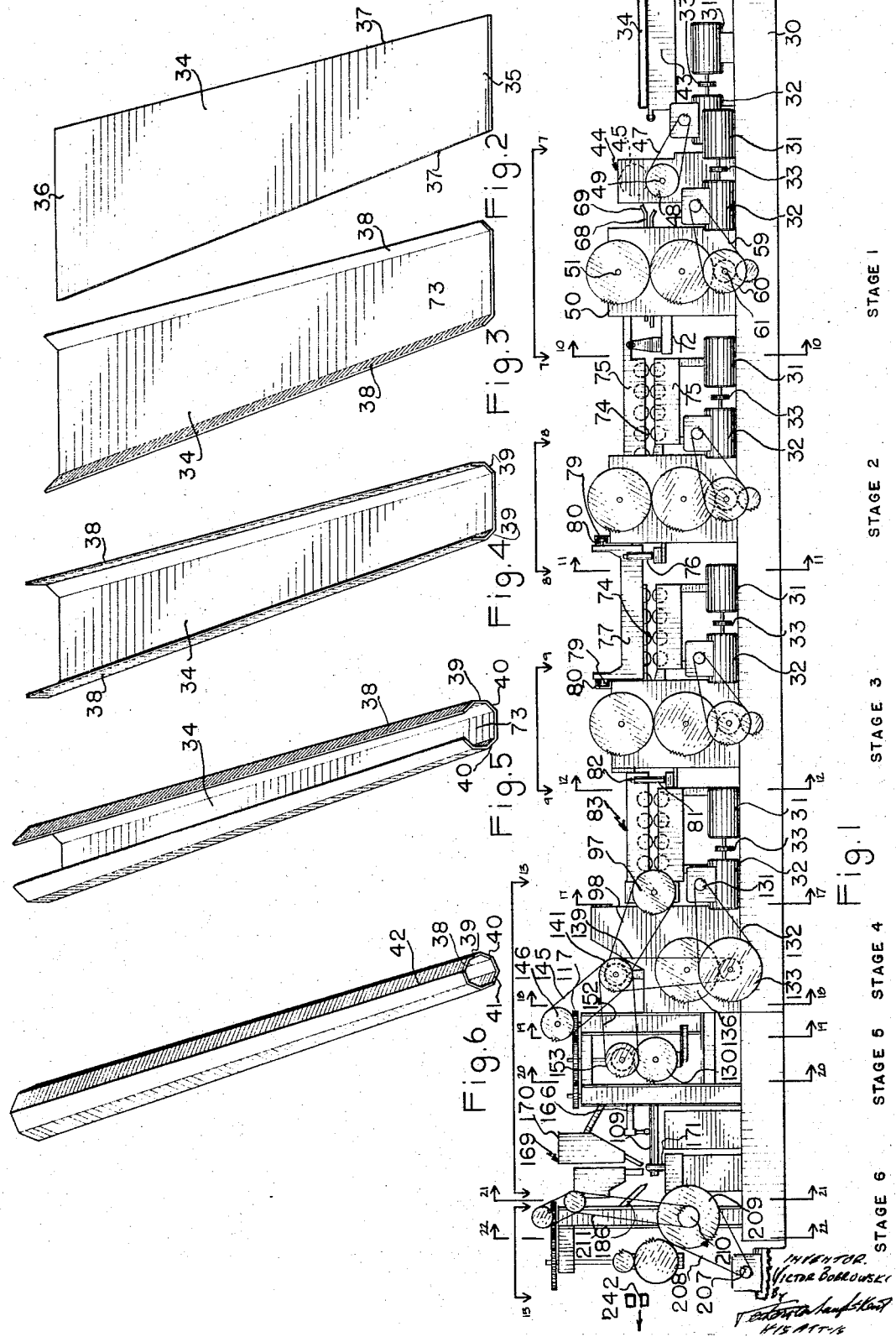

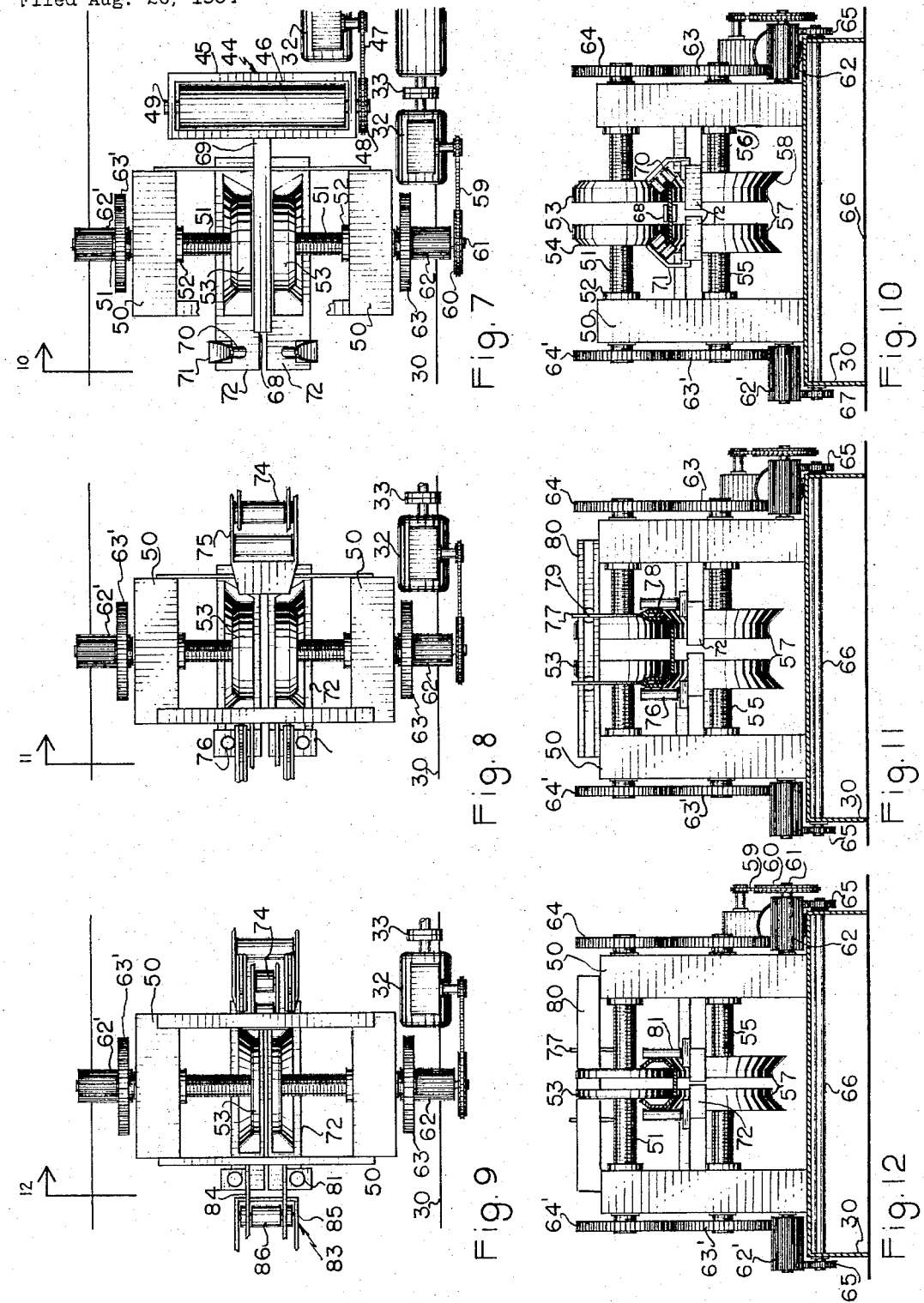

Jan. 2, 1968  V. BOBROWSKI  3,361,320

TAPERED-TUBE-MAKING DEVICE

Filed Aug. 20, 1964  4 Sheets-Sheet 3

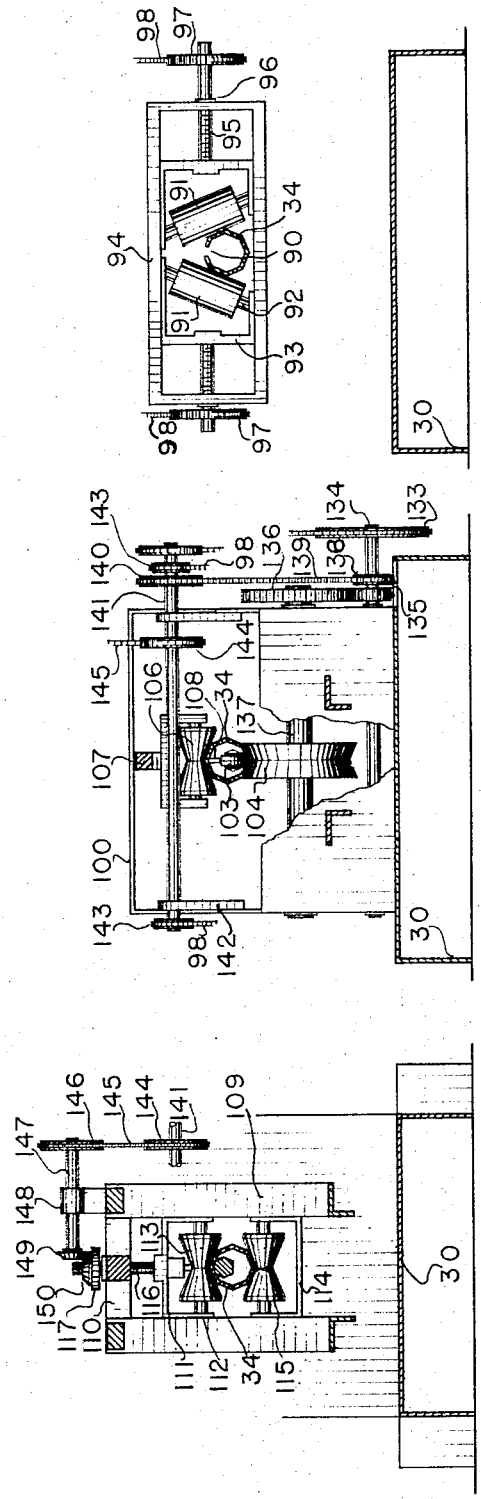
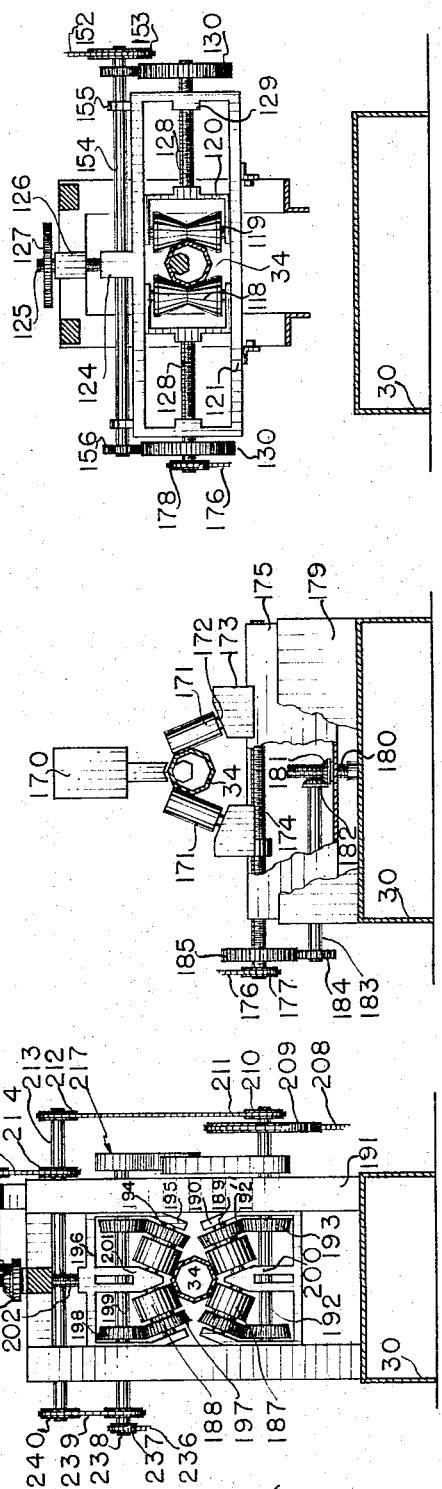

United States Patent Office 3,361,320
Patented Jan. 2, 1968

3,361,320
TAPERED-TUBE-MAKING DEVICE
Victor Bobrowski, 208 Bruce Ave., Winnipeg 12,
Manitoba, Canada
Filed Aug. 20, 1964, Ser. No. 390,878
33 Claims. (Cl. 228—17)

ABSTRACT OF THE DISCLOSURE

The invention relates to an apparatus for making tapered tubes from flat sheet by passing the sheet progressively through a plurality of sets of rollers which gradually form the sheet into the longitudinally tapered configuration after which the seam formed by the two edges of the sheet are welded together.

My invention relates to new and useful improvements in tube forming machines, particularly machines adapted for use to form tubes having a cross sectional area which increases progressively from one end to the other thus forming a straight sided, tapered tube.

Although the device hereinafter to be described and claimed is primarily concerned with tubing having an octagonal cross sectional configuration, nevertheless the same principles are involved in manufacturing tapered tubes having a circular cross section, an oval cross section, or any number of sides up to eight.

Heretofore, such tapered tubes, normally used for ornamental lamp standards and the like, are manufactured from relatively short lengths which are bent in a brake welded longitudinally and are then welded end to end to form the finished tube which may be anywhere from 16 feet in length up to 32 feet or more.

Such conventional methods are not only time consuming and expensive, but also present difficulties in obtaining a tapered tube which is relatively straight. It is well known that when welding tube lengths from end to end, distortion often occurs at the circumferential junctions.

Furthermore, these circumferential welds have to be ground down or otherwise removed so that a smooth exterior appearance results.

These difficulties have been overcome in the present device inasmuch as I provide means to form a planar sheet into the finished product as it passes through the device. The sheet used is provided with a narrow end and a wide end with the side edges gradually diverging from the said narrow end to said wide end.

This in turn occasions the provision of sequentially operating sets of rollers which will gradually widen apart as the sheet passes therethrough in order to accommodate the gradually increasing cross sectional dimensions of the product being formed.

Also provided is an automatic welding head which welds the longitudinal seam so that when the sheet has passed clear through the device, a finished tube is produced which tapers gradually from one end to the other and only requires painting in order to provide a finished product ready for use.

The principal object and essence of my invention is therefore to provide a device of the character herewithin described which permits a sequential forming of a tapered tube from a planar blank which increases in cross sectional area from one end to the other.

Another object of the invention is to provide a device of the character herewithin described which, within limits, is adapted to provide finished tubular products of varying lengths.

Yet another object of the invention is to provide a device of the character herewithin described which includes means for the various stages to return to the starting position ready to receive a further blank which may be entered into the machine as soon as the previous tube has been completed.

A yet further object of the invention is to provide a device of the character herewithin described which is readily changed to provide tapered tubes having cross sectional configurations of varying kinds such as square, round, oval, hexagonal, octagonal, and the like.

Yet another object of the invention is to provide a device of the character herewithin described which facilitates the manufacture of tapered tubes used for ornamental lamp standards and the like and eliminates the use of a brake and the necessity of circumferential welding presently required.

A still further object of the invention is to provide a device of the character herewithin described which reduces the cost of manufacture of relatively long lengths of tubes having an increasingly tapered cross sectional area from one end to the other.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of my device.

FIGURE 2 is an isometric view of a blank prior to entry into the machine.

FIGURE 3 is an isometric view of the blank after it has passed through stage 1 of the device.

FIGURE 4 is an isometric view of the blank after it has passed through stage 2 of the device.

FIGURE 5 is an isometric view of the blank after it has passed through stage 3 of the device.

FIGURE 6 is an isometric view of the completed tube after it has passed through stage 4, but prior to welding.

FIGURE 7 is a top plan view of stage 1 of the device.

FIGURE 8 is a top plan view of stage 2 of the device.

FIGURE 9 is a top plan view of stage 3 of the device.

Figures 13, 14, 15, 16, 16A, 16B:
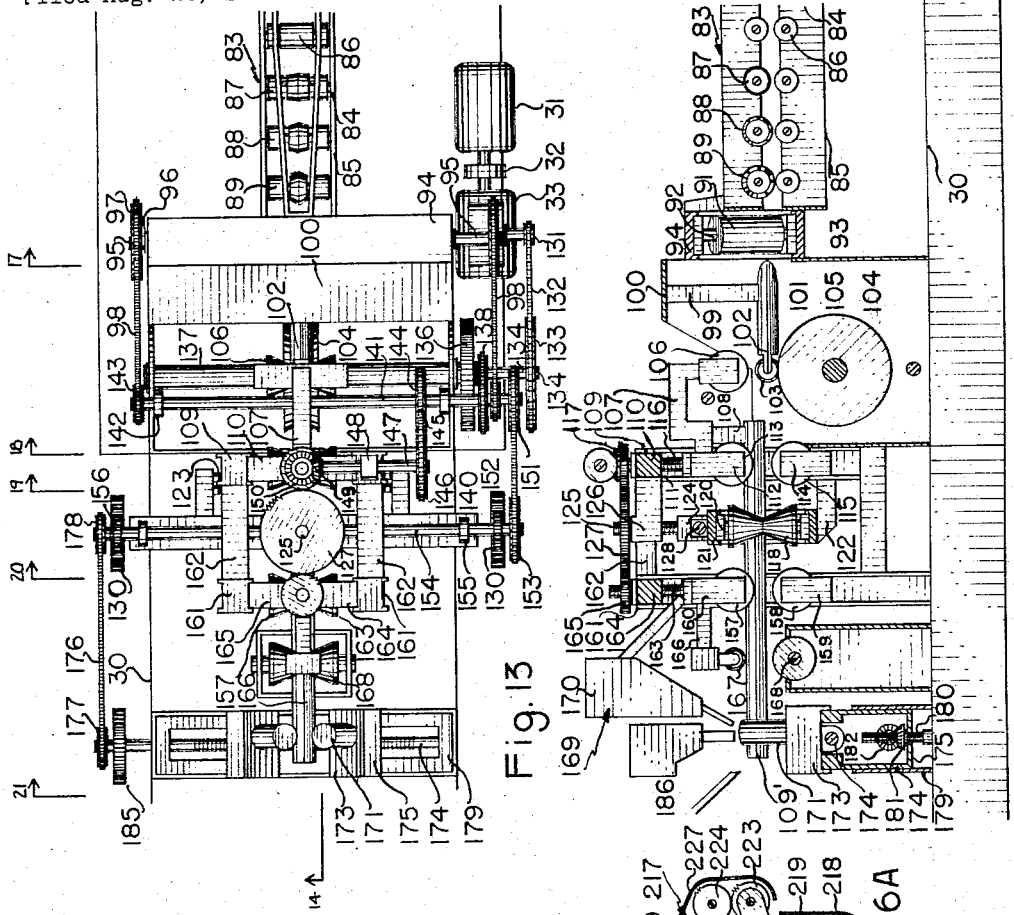

FIGURE 10 is a sectional view taken just beyond stage 1 along the line 10—10 of FIGURE 1 and 10 of FIGURE 7.

FIGURE 11 is a view similar to FIGURE 10, but taken after stage 2 and along the line 11—11 of FIGURE 1 and 11 of FIGURE 8.

FIGURE 12 is a view similar to FIGURE 11, but taken beyond stage 3 substantially along the line 12—12 of FIGURE 1 and 12 of FIGURE 9.

FIGURE 13 is a top plan view of stages 4 and 5 taken along the lines 13—13 of FIGURE 1.

FIGURE 14 is a side sectional view taken along the line 14—14 of FIGURE 13.

FIGURE 15 is a top plan view of FIGURE 1 taken along the line 15—15 thereof.

FIGURE 16 is a side elevation of FIGURE 15.

FIGURE 16A is a detail view taken along the line 16A of FIGURE 15.

FIGURE 16B is a detail view taken along the line 16B of FIGURE 15.

FIGURE 17 is a section of FIGURE 1 taken along the line 17—17 of FIGURE 1 and 17 of FIGURE 13.

FIGURE 18 is a sectional view along the line 18—18 of FIGURE 1 and 18 of FIGURE 13.

FIGURE 19 is a section along the line 19—19 of FIGURE 1 and 19 of FIGURE 13.

FIGURE 20 is a section along the line 20—20 of of FIGURE 1, and 20 of FIGURE 13.

FIGURE 21 is a section along the line 21—21 of FIGURE 1, and 21 of FIGURE 13.

FIGURE 22 is a section along the line 22—22 of FIGURE 1, and 22 of FIGURE 15.

In the drawings like characters of reference indicate corresponding parts in the different figures.

FIGURE 1 shows a side elevation of the entire machine mounted upon a longitudinally extending supporting structure 30. The machine generally consists of stages 1, 2, 3, 4, 5 and 6 as illustrated generally in FIGURE 1.

All of the stages are driven by an independent source of power such as an electric motor 31 and a speed reducing gear box 32 connected to the electric motor by means of couplings 33, and these reference characters have been used to designate the independent sources of power throughout the drawings.

In general, a planar blank 34 is precut as illustrated in FIGURE 2 with a narrow end 35 and a wide end 36, the side edges 37 diverging from the narrow end 35 to the wide end 36.

After passing through stage 1, flanges 38 are formed on the blank as shown in FIGURE 3.

After passing through stage 2, further flanges 39 are formed on the blank as shown in FIGURE 4.

After passing through stage 5, flanges 40 are formed on the blank as shown in FIGURE 5.

After passing through stage 4, the final flanges 41 are formed thus producing the product shown in FIGURE 6 which is now ready for welding along the final longitudinal seam 42 which is formed by the side edges 37 of the blank meeting together.

The blank 34, prior to entering the machine, is mounted upon a feed table 43 which is of conventional construction and permits the blank to be fed into the machine in alignment with the blank feeding device collectively designated 44 and shown in FIGURES 1 and 7.

This consists of supporting framework 45 within which are journalled for rotation a pair of feed rollers 46, one only of which is shown. These feed rollers are one above the other and are driven by the source of power 31 through chain 47 engaging around gear 48 which is secured to the shaft 49 of the lowermost feed roller.

These feed rollers drive the blank into the machine, said blank entering at stage 1, the details of which will now be described.

Reference should be made to FIGURES 7 and 10 which show a pair of spaced and parallel side support members 50 mounted upon the supporting framework 30 and extending upwardly therefrom.

A pair of oppositely screw threaded shafts 51 are journalled for rotation within bearing nuts 52 carried within the side supports 50. On the inner ends of each of these shafts is secured an upper forming roller 53 having a flange forming contour 54 as clearly illustrated.

Situated immediately below the shafts 51 is a further pair of shafts 55 also oppositely screw threaded and being journalled for rotation within bearing nuts 56 also carried within the side support members 50.

Secured to the inner ends of each of these shafts is a lower forming roller 57 also having a flange forming contour 58 as shown in FIGURE 10. The upper rollers 53 are spaced slightly from the lower rollers 57 sufficiently to permit the passage therebetween of the blank 34 and the contours 54 and 58 of these rollers are adapted to form the first flanges 38 upon the sides of the blank as illustrated in FIGURE 3.

However, it will be appreciated that, due to the fact that the blank widens from one end to the other, the rollers 53 and 57 have to be moved outwardly progressively as the blank passes therethrough in order that the width of the flanges 38 may increase progressively from one end to the other.

The screw threaded mounting of the shafts 51 and 55 accomplishes this as, when the rollers are rotated, the spindles engaging the nuts 52 and 56, cause the rollers to move apart progressively.

The source of power 31 is connected to the spindles 51 and 55 by means of chain 59 engaging sprocket 60 which in turn is secured to shaft 61 journalled for rotation in one side member 50.

A relatively wide spur gear 62 is secured to shaft 61 and a spur gear 63, secured to screw threaded shaft 65, engages spur gear 62. This gear 63 also engages a further spur gear 64 secured to the upper shaft 51.

Also engageable with the spur gear 62 is a further spur gear 65 secured to a cross shaft 66 journalled for rotation within the supporting framework 30 and extending thereacross.

A further spur gear 67 is secured to the other end of shaft 66 and this spur gear in turn engages a relatively wide spur gear 62′ journalled to the opposite side member 50 and complementary to the aforementioned spur gear 62.

Spur gears 63′ and 64′ correspond to spur gears 63 and 64 and transmit rotative power to all four rollers.

The relatively wide spur gears 62 and 62′ permit the engaging spur gears 63 and 63′ to remain in engagement as the shafts 55 move outwardly and inwardly due to the screw threaded mounting thereof within bearing nuts 56.

After passing through the pressure feed rollers 46, the narrow end 35 of the blank is fed into stage 1 by the provision of a pair of spaced and parallel plates 68, the ends 69 of which diverge vertically to receive the said narrow end 35.

These plates extend between the two sets of rollers 53 and 57 as shown in FIGURES 1, 7 and 10.

After passing through stage 1, the formed flanges 38 are engaged by pairs of spaced and inclined rollers 70 carried upon brackets 71 which in turn are mounted upon yokes 72.

Each yoke is an open rectangular frame extending around each of the lower rollers 57 and moved outwardly therewith, one end of the yoke sliding upon and being supported by transverse frame member 72.

Not illustrated in the drawings, are the necessary switches for the operation of the sources of power 31. However, these are conventional and are operated by micro-switches which in turn are actuated by the passage of the blank through the various sections.

For example, as the nose 35 of the blank approaches stage 1, a micro-switch is tripped which starts the source of power 31 operating stage 1 so that the rollers commence rotating as the nose 35 of the blank enters these rollers. By the time the blank has passed clear through this section, the rollers 53 and 57 are at their widest separation in order to accommodate the wide or rear end 36 of the blank. As the rear end 36 of the blank leaves stage 1, a micro-switch is released which reverses the direction of rotation of the power source 31 of this stage thus causing the rollers and spindles 51 and 55 to rotate in the opposite direction. Due to the screw threaded engagement of these spindles with the bearing nuts 52 and 56, the rollers move inwardly to their narrowest position at which time a further micro-switch is contacted by the rollers to switch off the source of power 31 so that this stage is ready to receive the nose end 35 of the next blank entering the machine.

The sources of power of all of the stages are controlled by similar micro-switch operation but, as hereinabove mentioned, such operating procedures are conventional and it has therefore not been deemed necessary to illustrate same.

*Stages 2 and 3*

Stages 2 and 3 illustrated in FIGURES 8, 11 and 9, 12 respectively, are similar in basic principle to stage 1 inasmuch as sets of rollers are provided mounted upon oppositely screw-threaded spindles, said rollers moving outwardly to accommodate the increasing width of the blank as it passes therethrough and where similar structure is involved, similar reference characters to those used to describe stage 1 have been utilized.

However, it will be observed that the contour of the sets of rollers in stages 2 and 3 is different, particularly the configuration of the rollers shown in FIGURES 9 and 12 which constitutes stage 3 of the device.

Stage 2 forms the second flange 39 on the blank thus causing the first formed flanges 38 to be situated vertically as shown in FIGURES 4 and 11.

Stage 3 forms the third flange 40 so that the blank takes the configuration shown in FIGURES 5 and 12.

When passing between stages 1 and 2, the planar portion 73 of the blank, passes between a plurality of sets of support rollers 74 mounted upon frames 75 as shown in FIGURE 1 and in a portion of FIGURE 8.

The lower rollers 57 of stage 2 are also surrounded by yokes 72 similar to those described in stage 1, said yokes carrying vertically situated guide posts 76 which engage the sides of guide plates 77 which extend between stages 2 and 3.

Each of these guide plates is provided with a bifurcated lower edge 78 through which the now vertically situated flanges 38 pass as shown in FIGURE 11. These side plates are carried upon rollers 79 which in turn run freely within transversely situated tracks 80 situated upon the upper sides of stages 2 and 3.

As the blank widens, the yokes 72, together with the guide posts 76 move outwardly and the guide plates 77 are moved outwardly by the engagement of the vertically situated flanges 38 of the blank, within the bifurcated lower edges 78 of the guide plates.

When the blank has passed clear through stage 2, and the rollers 53 and 57 have been reversed, the rollers move inwardly carrying with them the guide posts 76 which also carries in with them the guide plates 77 ready to receive the next succeeding blank passing through this stage.

Also provided between stages 2 and 3 are sets of rollers 74, similar to those between stages 1 and 2.

In stage 3, illustrated in FIGURES 9 and 12, it will be noted that the upper pair of rollers 53 are relatively narrow in width to permit the third flanges 40 to be formed on the blank.

Yokes 72 also surround the lowermost pair of rollers 57 and are moved outwardly and inwardly thereby, said yokes carrying vertically situated rollers 81 upon spindles 82 which engage the flanges 39 of the blank which are now in the vertical position shown in FIGURE 5.

Once again these rollers move outwardly and inwardly with the rollers which in turn are mounted upon the oppositely screw threaded shafts 51 and 55.

After passing stage 3, it is now necessary to form the final longitudinally extending bend centrally along the remaining planar portion 73 of the blank thus bringing the side edges 37 of the blank together to form the welding seam 42.

It will be appreciated that this bend is one of the most difficult to form and for this reason the intermediate section between stages 3 and 4, collectively designated 83, preforms or commences to form this last angulation.

In the present device, four sets of rollers constitute this intermediate section 83, each set including an upper roller and a lower roller, the upper rollers being carried within frame 84 and the lower rollers within frame 85.

The first set 86 of these rollers are conventional parallel rollers (see FIGURES 13 and 14). The second, third and fourth sets 87, 88 and 89 are progressively increasing, bend forming rollers, the side flanging of the upper and lower rollers increasing as shown in FIGURES 13 and 14. Also the spacing decreases so that as the blank passes beneath the last pair of rollers 89, the bend is almost fully formed, so that the cross sectional configuration of the blank is similar to that shown in FIGURE 17.

The gap 90 between the side edges 37 has now to be closed prior to welding and stages 4 and 5 accomplish the final forming and relieve the majority of the stress inherent with the forming of the last bend due to the resiliency of the material.

After leaving the last set of rollers 89, of the intermediate stage 83, the blank, now formed into the tapered tube, passes through a pair of inclined rollers 91 mounted upon shafts or spindles 92 which in turn are mounted upon sliding frames 93 journalled for sideways movement within stationary frame 94 carried by the supporting structure.

These frames include oppositely screw threaded spindles 95 secured to the frames and extending through screw threaded bearing nuts 96 within the frame 94.

Sprockets 97 are secured to each of these screw threaded shafts and driven by chains 98 as will hereinafter be described.

As the tube passes through these rollers, the shafts 92 are rotated thus moving the rollers apart progressively to accommodate the gradually increasing cross sectional area of the formed tube.

In all instances it will of course be appreciated that the various screw threaded shafts that have been described, are oppositely threaded so that when they are rotated in the same direction, they move apart or together depending upon the direction of rotation.

*Stages 4 and 5*

Stages 4 and 5 constitute the final forming and sizing stages immediately prior to the welding of the seam 42 and are shown in detail in FIGURES 13, 14, 18, 19 and 20.

A relatively thin cross section brace 99 is suspended vertically from cross member 100 and engages the gap 90 of the tube as it passes through this portion, said brace carrying a horizontally located portion 101 upon the end 102 of which is mounted a roller 103 engaging the base angulation in portion 73 of the blank, the flanges 41 of the blank nesting within a centrally located forming roller 104 mounted upon shaft 105 so that the blank is in the position shown in FIGURE 18.

An upper spool type roller 106 is journalled for rotation within a cantilever support 107 and is situated immediately above the rollers 103 and 104 and engages the upper flanges 38 thus tending to close the final seam or gap 90 as it passes thereunder.

However, the gap is not finally closed at this point as a further vertically situated brace 108 depends from cantilever support 107 but beyond the roller 106, said brace also being of relatively thin cross section and entering the gap 90 thus permitting the blank to pass thereby. This vertical brace 108 carries a longitudinally extending anvil 109' which is provided with a configuration shown in FIGURE 19 complementary to the angulation of the flanges 38 of the tube, and the various rollers within stages 4 and 5 engage the flanges 38 of the tube upon this anvil thus giving the final shaping to the flanges.

A pair of spaced and parallel vertically situated I-beams 109 extend upwardly from the supporting framework and a cross beam 110 spans the upper ends thereof. A yoke 111 is journalled for vertical movement between the I-beams 109, said yoke supporting the aforementioned cantilever 107 and the anvil 109'. Journalled for rotation between the arms 112 of the yoke is a spool type roller 113 engaging the upper flanges of the tube as it passes therethrough and journalled for rotation between a stationary yoke 114, immediately below the yoke 111, is a lower spool roller 115 engaging the flanges 41 of the formed tube as clearly shown in FIGURE 19.

As the tube progresses through the machine, the underside thereof remains horizontal to the supporting surface at all times so that it will be appreciated that the sides and upper surfaces of the tube gradually increase in diameter due to the taper being formed.

Now that the tube is closed, it is necessary to provide constantly increasing spacing between the various sets of horizontal rollers which will hereinafter be described, the first set being the rollers 113 and 115.

The yoke 111 is therefore provided with a screw threaded vertically situated shaft 116 which engages a screw threaded spur gear 117 mounted upon the cross member 110, whereby rotation of this spur gear causes the shaft 116 together with yoke 111 and cantilever 107 to move upwardly or downwardly depending upon the direction or rotation of said gear 117 so that, as the tube passes through this station, the distance between rollers 113 and 115 gradually increases to accommodate the increasing cross sectional diameter of the tapered tube.

The uppermost roller 113 applies pressure to the flanges 38 of the tube upon the shaped anvil 109' which, of course, also moves upwardly with this roller.

After passing through rollers 113 and 115, the tube is engaged by two vertically situated spool type rollers 118 mounted for rotation upon the spindles 119 which are in turn secured within vertically situated yoke frames 120. These yoke frames are mounted for horizontal outward and inward movement within a rectangular frame 121 which in turn is journalled for vertical movement with relation to the supporting surface.

A pair of off-standing arms 122 are secured to the rectangular frame 121 and extend rearwardly, said arms each carrying pairs of rollers 123 which engage the outer flanges of the aforementioned I-beams 109 thus journalling the frame 121 for vertical movement on the I-beam flanges.

A central support 124 is provided on the rectangular frame 121 and carries a screw threaded shaft 125 which extends upwardly through a support bearing 126 and engages a screw threaded spur gear 127 upon the upper side of the device, said spur gear engaging the aforementioned spur gear 117.

It will be noted that the diameter of the spur gear 127 is approximately twice the diameter of spur gear 117 so that the vertical movement of frame 121 is slower than the vertical movement of the yoke 111 and the components carried thereby. This is because the upward movement of the vertically situated rollers 118 is combined with outward movement thereof as the tube passes therethrough.

The aforementioned sliding frames 120 which mount the vertical rollers 118, are also provided with oppositely screw threaded shafts 128 which are supported within bearings 129 upon the ends of the rectangular frame 121 and engage a screw threaded spur gear 130 upon the outer ends thereof. Therefore rotation of spur gears 130 will cause the frames 120 together with the rollers 118 to move outwardly or inwardly depending upon the direction of rotation of spur gears 130.

The drive for the components hereinbefore described, relating to stages 4 and 5, are from the source of power 31 adjacent these stages, through the reduction gear box 33 which drives sprocket 131. A chain 132 extends around this sprocket and around sprocket 133 secured to shaft 134. This shaft extends transversely across the supporting structure and is journalled for rotation therewithin. It carries a spur gear 135 which engages spur gear 136 journalled to shaft 137 mounted within the supporting structure, said shaft 137 carrying the aforementioned forming roller 104 (see FIGURE 18) thus providing drive to this roller.

Shaft 134 also carries sprocket 138 around which extends chain 139 engageable with an upper sprocket 140 mounted upon shaft 141 which also spans the device and is supported within bearings 142.

This cross shaft carries sprockets 143, one upon each end thereof, around which extend aforementioned chains 98 engaging sprockets 97 (see FIGURE 17).

Also secured to cross shaft 141 is a sprocket 144, inboard of one of the bearings 142, a chain 145 extending around this sprocket and around a sprocket 146 secured to a horizontal shaft 147 journalled within bearing 148 supported upon one of the aforementioned I-beams 109 (see FIGURE 19).

A bevel gear 149 is secured to the inner end of shaft 147 and engages a further bevel gear 150 situated upon the aforementioned screw threaded shaft 116 immediately above the spur gear 117 thus providing drive to this spur gear and to the spur gear 127.

A further sprocket 151 is secured to the cross shaft 141 and chain 152 extends around this sprocket and around a sprocket 153 secured to a cross shaft 154 which is journalled within bearings 151 mounted upon the aforementioned rectangular frame 129.

Spur gears 156 are secured to the ends of this shaft and engage the aforementioned spur gears 130 to control the outwardly and inwardly movement of the vertically situated rollers 118.

After passing through the vertically situated rollers 118, the tube passes through horizontally situated rollers 157 and 158 (see FIGURE 14) which continue the sizing and forming operation upon the tube.

The lower roller 158 is stationary and is journalled within a yoke 159 and the upper roller 157 is journalled within a yoke 160 which is mounted for vertical movement within a further pair of spaced and parallel, vertically situated I-beams 161 which are similar to the I-beams 109 and which are braced by longitudinal members 162 extending between I-beams 109 and 161.

A screw threaded shaft 163 is secured centrally to yoke 160 and is journalled within cross brace 164 which is similar to cross brace 110.

A spur gear 165 screw threadably engages shaft 163, said spur gear also being engaged by spur gear 127 thus providing upward and downward movement to the yoke 160 as the tapered tube passes through this station.

An offstanding support 166 carries a spool roller 167 engaging the now closing seam or gap 90, anvil 109' coacting therewith.

A lower spool roller 168 supports the underside of the tapered tube as it passes this station and approaches the welding station collectively designated 169.

The welding assembly 170 is conventional and it is therefore deemed not necessary to describe the construction and operation in detail except to state that the welding of the seam is automatic and continuous as the tube passes through this station.

However, it is essential to maintain the seam 42 closed at this point in order to obtain an efficient weld and in this connection I have provided a pair of diagonally situated rollers 171 which engage the flanges 39 of the tube thus forcing the seam edges together upon the anvil 109'.

FIGURE 21 shows the details of this portion of the device in which the rollers 171, are mounted upon spindles 172 which in turn are supported upon bearing supports 173 screw threadably engaging a rotating screw threaded rod 174, one end of which is provided with right-hand threads and the other end with left-hand threads.

This is to permit the rotation of the shaft in one direction, to move the rollers 171 apart and vice versa.

The shaft 174 is mounted within a box frame 175 and is driven by means of a chain 176 engaging sprocket 177 secured to the shaft 174.

This chain also extends around a sprocket 178 in turn connected to the aforementioned shaft 154.

The diameter of the tube is gradually increasing as it passes through the welding station, therefore it will be appreciated that the rollers 171, as well as moving apart, have to move upwardly and in this connection, the box frame 175 is mounted for vertical movement within the support 179.

A stationary screw threaded shaft 180 is situated vertically and secured to the supporting structure 30 with a bevel gear 181 screw threadably engaging this shaft. A further bevel gear 182 engages bevel gear 181 and is secured to horizontal shaft 183 which is provided with a spur gear 184 upon the end thereof. The spur gear is engageable by a further spur gear 185 secured to the aforementioned shaft 174 so that rotation of shaft 183 causes the slidably mounted box frame component 175 to move upwardly or downwardly depending upon the direction of rotation, as the rollers 171 are moving outwardly or inwardly.

After passing through the welding station 169, which of course provides flux and welding rod, the surplus flux and the like is scraped from the seam by means of a scarfing scraper 186 which is mounted upon a vertically moving portion of the finishing stage 6.

*Stage 6*

This finishing stage is shown in FIGURES 15, 16 and 22 and is adapted to correctly size the tube as it passes therethrough and to eliminate any distortion occasioned by the heat of welding.

This stage includes a lower pair of angularly mounted rollers 187, which engage the flanges 41 of the tube, and an upper pair of angularly mounted rollers 188 which engage the flanges 38 of the tube.

The lower rollers 187 are mounted upon spindles 189 secured within brackets 190 supported by vertical frame members 191.

These spindles also include bevel gears 192′ engageable with further bevel gears 193 mounted upon a cross shaft 192 which is driven by the source of power 31 as will hereinafter be described.

The upper rollers 188 are also mounted upon spindles 194 carried within brackets 195 connected to a yoke 196 which is mounted for vertical movement within the support 191.

Bevel gears 197 are also secured to shaft 194 and engage further bevel gears 198 mounted upon an upper cross shaft 199 which is also driven by the source of power 31.

The inner ends of the spindles 189 and 194 are carried within centrally located brackets 200 and 201 extending from the frame 30 and the yoke 196 respectively, as shown in FIGURE 22. In this connection the aforementioned scarfing scraper 186 is also connected to the bracket 201.

A screw threaded rod 202 extends upwardly from yoke 196 and screw threadably engages a bevel gear 203 situated upon the upper side of this stage. Bevel gear 203 is engaged by bevel gear 204 secured to the drive shaft 205 which is supported within a bearing 206 upon one of the vertical supports 191.

From the foregoing it will be appreciated that rotation of bevel gear 203 causes the yoke 196 together with the upper rollers 188 and their associated drive bevel gears to move upwardly to accommodate the increasing cross sectional dimension of the tube being sized thereby.

The drive for the rollers 187 and 188 is from the source of power 31 via sprocket 207 around which extends chain 208 which in turn extends around a sprocket 209 secured to shaft 192, thus driving lower rollers 187.

A further sprocket 210 is secured to shaft 192, chain 211 extending therearound and around a further sprocket 212 mounted upon a cross shaft 213 situated adjacent the upper ends of the vertical supports 191.

A sprocket 214 is also secured to shaft 213 and a chain 215 extends around this sprocket and around sprocket 216 secured to the aforementioned shaft 205 thus supplying power to the bevel gears 204 and 203 which moves the yoke 196 upwardly or downwardly depending upon the direction of rotation.

As the yoke 196 moves upwardly and downwardly, together with the rollers 188, the power for these rollers requires a linear movable gear train assembly collectively designated 217 and shown in detail in FIGURE 16A.

Spur gear 218 is secured to shaft 192 and engages idler 219 mounted upon a shaft 220. This spur gear in turn engages a spur gear 221 which is one of a pair of spur gears connected together by link plates 222. Spur gear 221 engages the other one of the pairs of gears 223 which in turn engages idler 224. Idler 224 engages spur gear 225 which is mounted upon the aforementioned shaft 199 which moves upwardly and downwardly, being journalled within a slot 226 within one of the vertical supports 191.

As the yoke 196 moves upwardly or downwardly, the gear train 217 expands or contracts, the casing 227 providing support for the spindles carrying the gears 223 and 224. The link plates 222 retain the gears of the gear train in engagement one with the other thus permitting drive to be transmitted to the upper rollers 188 during the vertical movement thereof.

After passing through the angularly inclined rollers 187 and 188, the finished tube passes through a pair of horizontally mounted spool type rollers similar to those shown in FIGURE 19.

These rollers are not shown in detail in the drawings as the construction and mounting is similar to the spool rollers 157 and 158 shown in FIGURES 13 and 14. However, these rollers are power driven, the lower roller being mounted upon a spindle 228 journalled within the frame 229. A spur gear 230 is secured to this spindle and is engaged by a further spur gear 231 which in turn is secured to a spindle 232 journalled within bearings 234 and spanning the support frame 229. Similar spur gears 230 and 231 are secured upon the other ends of shafts or spindles 228 and 232 respectively.

A sprocket 235 is secured to shaft 232 and is provided with chain 236 extending therearound and engaging a further sprocket 237 which is mounted upon a shaft 238 and is driven by a chain 239 extending from sprocket 240 mounted upon the aforementioned shaft 213.

The uppermost spool roller which is secured to shaft 232, is supported in a vertically moving yoke similar to yoke 110 and is provided with screw threaded rod or shaft 239 screw threadably engaging a spur gear 240 which is driven by a further spur gear 241 driven by the aforementioned bevel gear 203.

While passing through the device, the blank and tube being formed therefrom, is urged forwardly by the feed rollers 46 and by the various forming rollers, which are power driven as hereinbefore described.

However, when the formed nose end of the tube passes through the final stages, the broad end 36 of the blank has left the feed roller and it is desirable to apply pulling power to the nose end of the tube in order to assist the forming rollers in urging the tube through the machine.

This can consist of a conventional clamping device shown schematically in FIGURE 1, indicated by the reference character 242 and may be connected to any source of pulling power such as a winch or the like.

It will be appreciated that the various outward and inward, and upward and downward movements of the various forming rollers hereinbefore described, are timed by the pitch of the screw threads of the various shafts, the speed of rotation of the source of power, and the gear or sprocket and chain ratios employed so that the various components move continuously to accommodate the increasing dimensions of the blank being formed into the tube.

It is desirable to have independent sources of power for the various stages as indicated, and these are controlled by micro-switches as has been mentioned previously.

Inasmuch as such control of sources of power is well known to those skilled in the art, it has not been deemed necessary to show full details of these.

However, briefly, as the nose 35 of the blank approaches the first stage, a micro-switch is actuated thereby thus starting the first stage. As the nose enters succeeding stages, these stages are actuated by similar micro-switches.

As the rear or broad end 36 of the blank leaves the stages, a micro-switch is released thus stopping the source of power, and a further micro-switch is actuated reversing the sources of power and returning the moving form rollers to their original position, at which time the source of power is switched off and is ready to receive the nose end of the next blank being fed into the machine.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for forming tubes having constantly increasing cross sectional areas, from a tapered planar blank sheet; comprising in combination, elongated supporting structure, a plurality of forming stages secured to said supporting structure therealong, feed means adjacent the first of said forming stages to feed said blank into said first forming stage, a source of power for said feed means and for each of said forming stages, each of said forming stages including multiple roller means for forming said blanks seriatim from a planar blank to a completed form, and said multiple roller means including means to widen the effective gap between some of said rollers horizontally and between some of said rollers vertically as said blank passes therethrough and to return said multiple roller means to the narrowest position after said blank has passed therethrough.

2. The device according to claim 1 which includes a final forming and sizing stage, final seam closing means, an automatic welding assembly adjacent said final seam closing means to weld said final seam, and a finishing stage after said welding assembly to size and contour said formed tube.

3. The device according to claim 1 in which each of said forming stages includes a pair of spaced and parallel lower forming rollers and a pair of spaced and parallel upper forming rollers coacting upon said blank as it passes therethrough to form said blank, an oppositely screw threaded spindle for each of said rollers of said pairs, said rollers being mounted upon the inner ends of said spindles, bearing nuts in said supporting framework within which said spindles are journalled for rotation, said source of power being operatively connected to said spindles whereby rotation thereof increases and decreases the gap between each roller of said pairs depending upon the direction of rotation of said spindles.

4. The device according to claim 2 in which each of said forming stages includes a pair of spaced and parallel lower forming rollers and a pair of spaced and parallel upper forming rollers coacting upon said blank as it passes therethrough to form said blank, an oppositely screw threaded spindle for each of said rollers of said pairs, said rollers being mounted upon the inner ends of said spindles, bearing nuts in said supporting framework within which said spindles are journalled for rotation, said source of power being operatively connected to said spindles whereby rotation thereof increases and decreases the gap between each roller of said pairs depending upon the direction of rotation of said spindles.

5. The device according to claim 2 in which said final seam closing means include a pair of inclined rollers engaging the sides of the formed tube adjacent the final seam and urging the edges of said seam together, a bearing support mounting each of said rollers for rotation thereon, a cross shaft having left and right screw threads formed thereon, said bearing supports screw threadably engaging said cross shaft, a vertical movable box frame component mounted on said supporting structure, said cross shaft being supported by said box frame, and a jack shaft extending between said box frame and said supporting structure for moving said box frame upwardly and downwardly, said source of power being operatively connected to said cross shaft and to said jack shaft.

6. The device according to claim 4 in which said final seam closing means includes a pair of inclined rollers engaging the sides of the formed tube adjacent the final seam and urging the edges of said seam together, a bearing support mounting each of said rollers for rotation thereon, a cross shaft having left and right screw threads formed thereon, said bearing supports screw threadably engaging said cross shaft, a vertical movable box frame component mounted on said supporting structure, said cross shaft being supported by said box frame, and a jack shaft extending between said box frame and said supporting structure for moving said box frame upwardly and downwardly, said source of power being operatively connected to said cross shaft and to said jack shaft.

7. The device according to claim 2 in which said final forming and sizing stage includes a set of spool type rollers situated horizontally, a set of spool type rollers situated vertically, said rollers engaging the formed flanges of said tube as it passes therethrough, and means to widen the gap progressively between said sets of rollers as said tube passes therethrough and to narrow the gap between said sets of rollers after said tube has passed therethrough.

8. The device according to claim 4 in which said final forming and sizing stage includes a set of spool type rollers situated horizontally, a set of spool type rollers situated vertically, said rollers engaging the formed flanges of said tube as it passes therethrough, and means to widen the gap progressively between said sets of rollers as said tube passes therethrough and to narrow the gap between said sets of rollers after said tube has passed therethrough.

9. The device according to claim 5 in which said final forming and sizing stage includes a set of spool type rollers situated horizontally, a set of spool type rollers situated vertically, said rollers engaging the formed flanges of said tube as it passes therethrough, and means to widen the gap progressively between said sets of rollers as said tube passes therethrough and to narrow the gap between said sets of rollers after said tube has passed therethrough.

10. The device according to claim 6 in which said final forming and sizing stage includes a set of spool type rollers situated horizontally, a set of spool type rollers situated vertically, said rollers engaging the formed flanges of said tube as it passes therethrough, and means to widen the gap progressively between said sets of rollers as said tube passes therethrough and to narrow the gap between said sets of rollers after said tube has passed therethrough.

11. The device according to claim 2 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first mentioned horizontally situated spool type rollers, and means to widen and narrow the gap between said first-mentioned horizontally situated spool rollers and said second-mentioned horizontal spool rollers as said tube passes therebetween.

12. The device according to claim 4 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first-mentioned horizontally situated spool type rollers, and means to widen and narrow the gap between said first-mentioned horizontally situated spool rollers and said second-mentioned horizontal spool rollers as said tube passes therebetween.

13. The device according to claim 5 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first-mentioned horizontally situated spool type rollers, and means to widen and narrow the gap between said first-mentioned horizontally situated spool rollers and said second-mentioned horizontal spool rollers as said tube passes therebetween.

14. The device according to claim 6 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first-mentioned horizontally situated spool type rollers, and means to widen and narrow the gap between said first-mentioned horizontally situated spool rollers and said second-mentioned horizontal spool rollers as said tube passes therebetween.

15. The device according to claim 8 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first-mentioned horizontally situated spool type rollers, and means to widen and narrow the gap between said first-mentioned horizontally situated spool rollers and said second-mentioned horizontal spool rollers as said tube passes therebetween.

16. The device according to claim 9 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first-mentioned horizontally situated spool type rollers, and means to widen and narrow the gap between said first-mentioned horizontally situated spool rollers and said second-mentioned horizontal spool rollers as said tube passes therebetween.

17. The device according to claim 10 in which said final forming and sizing stage includes an elongated anvil supported horizontally internally of said tube, the cross sectional configuration of the upper tube contacting portion of said anvil complementing the cross sectional configuration of the portion of the tube contacting said anvil, and at least one horizontally situated spool type roller contacting said portion of said tube exteriorly thereof and engaging said portion of said tube upon said anvil as said tube passes through said final forming and sizing stages, horizontal spool type rollers supporting said tube on the underside thereof and situated vertically below said first-mentioned horizontally situated spool type rollers, and means to widen and narrow the gap between said first-mentioned horizontally situated spool rollers and said second-mentioned horizontal spool rollers as said tube passes therebetween.

18. The device according to claim 2 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanding gear train situated between said source of power and said upper set of inclined rollers.

19. The device according to claim 4 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

20. The device according to claim 5 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

21. The device according to claim 6 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

22. The device according to claim 8 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and linearly expanded gear train situated between said source of power and said upper set of inclined rollers.

23. The device according to claim 9 in which said fiinishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

24. The device according to claim 10 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

25. The device according to claim 11 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

26. The device according to claim 13 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

27. The device according to claim 14 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

28. The device according to claim 15 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

29. The device according to claim 16 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

30. The device according to claim 17 in which said finishing stage includes an upper pair of inclined rollers and a lower pair of inclined rollers, said pairs of rollers engaging the exterior contour of said formed tube as it passes therethrough, said upper and lower pairs of rollers being connected to said source of power, means to widen the gap between said upper and lower pairs of rollers as said tube passes therebetween, said means including a yoke mounted for vertical movement between a pair of spaced and parallel vertical supports, a screw-threaded shaft secured to said yoke and extending upwardly therefrom, said shaft screw threadably engaging a drive gear connected to said source of power, and a linearly expanded gear train situated between said source of power and said upper set of inclined rollers.

31. In a tube-forming device for forming progressively tapered tubes from a planar blank; means for progressively increasing the gap between upper and lower pairs of forming rollers as said blank passes therethrough said means including an oppositely screw-threaded spindle for each of said rollers of said pairs, said rollers being mounted upon the inner ends of said spindles, bearing nuts in the supporting framework of the device within which said spindles are screw threadably journalled for rotation, a source of power connected to said spindle whereby rotation thereof increases or decreases the gap between each roller of each pair depending upon the direction of rotation of said spindles.

32. In a tube forming device for forming progressively tapered tubes from a planar blank, means for progressively increasing the gap between upper and lower forming rollers as said blank passes therethrough; said means including a vertically situated screw-threaded shaft mounting said upper forming roller and a drive gear screw threadably engaging said shaft, said drive gear being connected to a source of power.

33. In a tube-forming device for forming progressively tapered tubes from a planar blank; means for progressively widening the gap between vertically situated spool type forming rollers as said formed blank passes therethrough; said means including frames for mounting said vertically situated rollers for rotation, a main frame within which said first-mentioned frames are mounted for horizontal movement therein, said main frame being mounted in supporting structure for vertical movement therein, screw threaded shafts extending between said first-mentioned frames and said main frame and being screw threadably engageable within said main frame, a screw-threaded shaft secured to said main frame and extending vertically upwards therefrom, and a drive gear screw threadably engageable by said last mentioned shaft, whereby rotation of said first-mentioned shafts moves said rollers outwardly from one another and rotation of said drive gear moves said main frame and said rollers upwardly with respect to the formed tube passing between said rollers.

No references cited.

RICHARD H. EANES, JR., *Primary Examiner.*